July 3, 1945.                W. J. MILLER                2,379,737
PRESSING APPARATUS FOR SHAPING CLAY AND METHOD OF OPERATION
Filed May 3, 1938
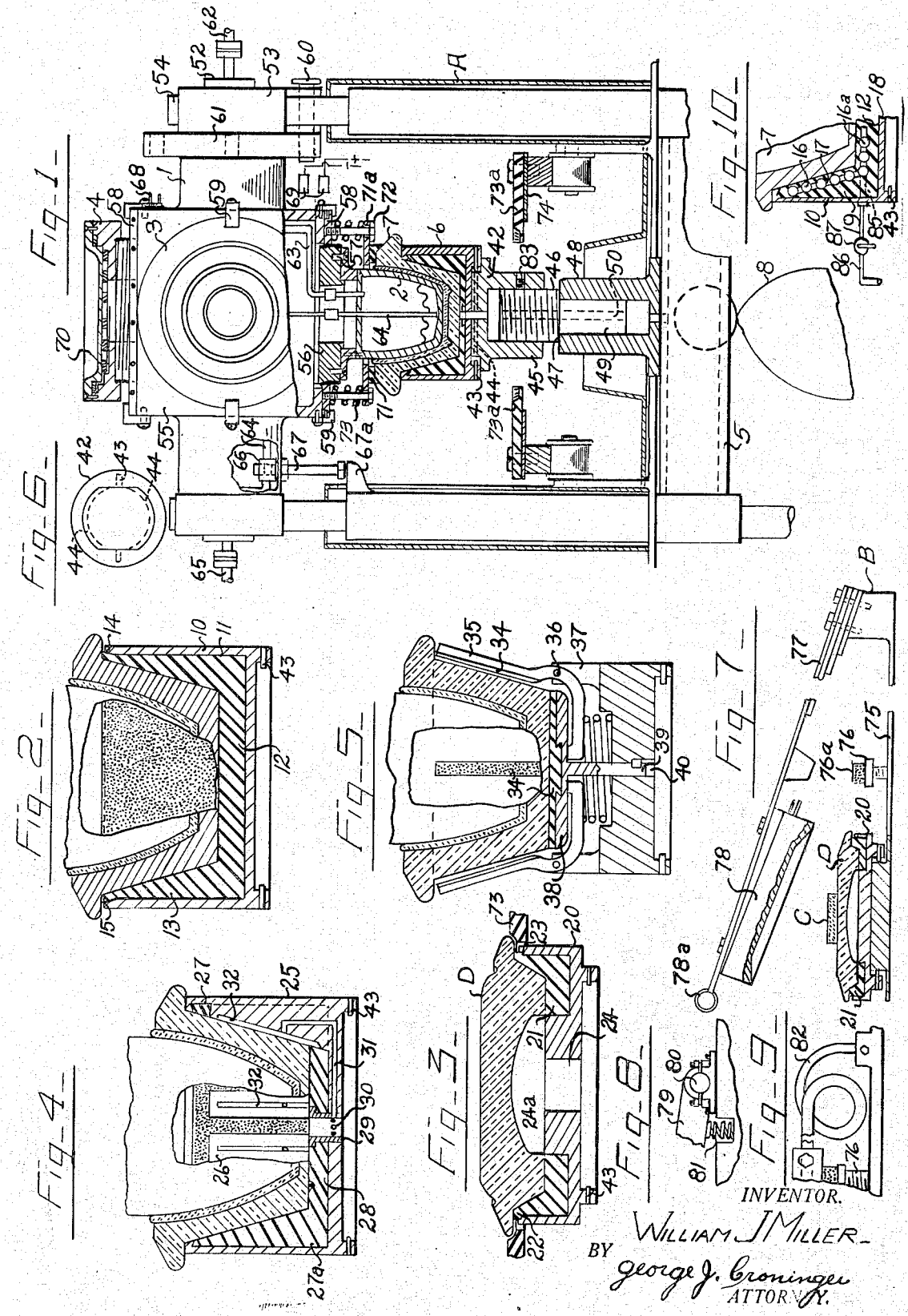
INVENTOR.
WILLIAM J MILLER
BY George J. Croninger
ATTORNEY.

Patented July 3, 1945

2,379,737

UNITED STATES PATENT OFFICE 2,379,737

PRESSING APPARATUS FOR SHAPING CLAY AND METHOD OF OPERATION

William J. Miller, Swissvale, Pa., assignor to Miller Pottery Engineering Company, Swissvale, Pa., a corporation of Pennsylvania Application May 3, 1938, Serial No. 205,711

29 Claims. (Cl. 25—27)

This invention relates to methods and apparatus for manufacturing potteryware, particularly semi-vitreous and vitreous table and household articles such as plates, cups and saucers and the like.

It has to do broadly with the fabrication of the ware from plastic clay and relates particularly to the application and conformation of the clay to the molds in the making of blanks or ware.

In the manufacture of jiggered potteryware by hand, the "batter out" flattens a lump of clay on a plaster block with a hand mallet preparatory to applying the same to a mold. The resulting slab of clay which has slight resemblance to the finished product is termed a "bat" and is thrown onto the molding surface of a plaster mold after which the back and foot are completed by profiling preparatory to drying. The process requires considerable skill and much hard labor.

In my Reissue Patent No. 20,401 is described a novel method and machine for mechanically applying clay to molds with a contoured die. The machine is capable of making "blanks," meaning a mold bonded piece having brim and faces approximating that of the completed product but requiring jiggering to complete the same, or "ware" meaning a shaped mold-bonded product either ready for drying or requiring only a light polishing to complete the same. Wherever these terms shall occur throughout the following description and claims, they shall be construed as referring to a product having the descriptive characteristics just enumerated.

The process disclosed in my reissue patent was responsible for the elimination of weak spots at the center of the piece, a common fault with hand made bats, also, the density of the blank or ware was increased which resulted in superior dry strength and greater resistance to breakage. By pressing the clay on the mold, an improved mechanical and capillary bond was obtained therebetween which contributed, together with the elimination of needless procedural steps, to adapting the process to high speed automatic fabrication practice and mass production manufacture.

The molds employed both in manual and mechanical jiggering are made of plaster of Paris which has a low tensile strength and little or no bending moment. These molds are made up in sets of 500 to 5000 each and will invariably have fractional differences in dimensions and slightly irregular or uneven external surfaces sometimes visible to the naked eye. Heretofore, in automatic blank and ware making, I have supported the mold in a metal chuck either by the brim, on the bottom, or both. Any unevenness or irregularities in the bottom or brim of the mold or chuck have been found to develop localized pressure zones under the press responsible for bending strains resulting in the breakage of the mold.

In high speed mechanical blank and/or ware forming practice, a broken mold can be responsible for losses of various description, viz: the expensive mold itself, the time lost in removing the broken mold from the chuck and cleaning out the chips and the lost production due to the ensuing interruption in the operation of the machine. It therefore becomes a matter of prime importance to avoid mold breakage and I have determined that the chief cause of the trouble has heretofore been in the method of and the means for supporting the mold.

It is proposed herein to obtain a uniform distribution of the pressure normally applied to a mold incident to blank or ware formation by supporting the molds in a medium which will intimately contact the mold on all supporting surfaces regardless of any unevenness or irregularities and will adapt itself to fractional differences in dimensions thereof. This medium will have the characteristics of a fluid in respect of incompressibility, flowability and shape alteration without permanent deformation. Since it is impractical to seat the molds directly in a liquid, in carrying out my invention, due to leakage and oxidation factors, my invention comprehends the use of a substitute therefor such as for instance rubber or the equivalent.

In practicing the invention, a liner (into which the base of the mold will be freely insertable) externally conforming to the internal dimensions of the cavitous chuck will be confined to and preferably secured therein. Because of the fluid like characteristics thereof, the liner will have the ability to adapt itself to the confining space, to wit: the zone between the internal wall of the chuck and the external wall of the base of the mold, and under pressure will intimately contact the chuck and mold and will fill in any voids due to surface irregularities, unevenness, etc. so reliably that a uniformly distributed backing up pressure will be exerted over the entire portion of the mold opposed to the chuck. This avoids localized bending zones and eliminates breakage even under higher pressure than are customarily employed.

The objects of this invention are to prevent breakage of the brittle plaster molds under the press or forming die, to prolong mold life and productivity, reduce the possibility of damage to the molds from chipping and cracking of the brims and bases which is customary where the molds come into engagement with rigid metallic surfaces and to avoid damage to the molds in case chips or spald lodge unnoticed in the bottom of the chuck.

In addition to the foregoing, this invention contemplates a novel form of press with which chucks of the character herein described may be advantageously used, the machine having rubber surfaced parts which normally come into engagement with the molds and novel, quick change facilities for the chuck and dies. With these latter provisions, which include a rotatable turret supporting a plurality of pressing dies of diverse character quickly alterable at the press position and a demountable, separable and adjustable chuck supporting unit, shape changes may be made with greater speed and less work and owing to improved current and steam transmission facilities without the customary delays experienced on a single head press in preheating the dies. The advantages of this construction reside in increased production, greater diversification and the conservation of time and labor.

In the drawing:

Fig. 1 is a sectional elevation of the mold chucking arrangements incorporated in a novel multiple head automatic press.

Fig. 2 is a sectional elevation of a mold chuck adapted for hollow ware molds employing an imperforate, solid rubber liner.

Fig. 3 is a sectional elevation of a chuck adapted for flat ware molds employing a liner having the same physical characteristics as that of Fig. 2.

Fig. 4 is a sectional elevation of a chuck adapted for hollow ware molds having a perforated ribbed liner.

Fig. 5 is a sectional elevation of a mechanically operated "grip" chuck with the gripping and mold support surface faces with the material in question.

Fig. 6 is a top plan view of a locking mounting for the chuck.

Fig. 7 is a side elevation of a hand operated batting or blank forming machine mounting the chuck and mold of Fig. 3, the mold chuck and the base of the machine being shown in section.

Fig. 8 is a detail of a pivot mounting for the die supporting lever of Fig. 7.

Fig. 9 is a detail of another mounting for the die of Fig. 7.

Fig. 10 is a fragmentary detail in section of a chuck adapted for hollow ware molds provided with a liner having a series of communicating pressure ducts filled with a fluid.

With reference to Fig. 1, I have shown therein a novel form of blank or ware forming apparatus A which comprises, generally, a rotatable turret 1 on which a multiple of diverse hollow ware and flatware dies 2, 3 and 4 are mounted which are alterable at the working position together with a vertically reciprocating crosshead 5 which supports the hollow ware mold chuck 6 and mold 7 by means of novel mounting arrangements later specified, for co-operation with the die 2. The press machine shown may represent either a complete unit in itself or the press station in an automatic jigger. Furthermore, the machine A may be mechanically operated by means of a cam 8 or manually by means of a foot pedal 9 in which case the crosshead would be counterbalanced.

The chuck 6 which includes the novel features herein enumerated comprises (Fig. 2) a metal shell 10 provided with a liner 11 externally contoured to the internal contour of the chuck shell and being made up of rubber or equivalent material, the liner being preferably secured in place. The base 12 of the liner is comparatively thick because the displacement factor is apt to be greater than in other zones. Ample material is also provided to insure that all the voids which may occur in this and other zones due to irregularities in the external contour of the mold will be filled. The side wall 13 of the liner tapers upwardly from the thickened base and may project beyond the tapered brim 14 of the shell at 15 to thereby circumferentially support the brim 15 of the mold out of engagement with the metal brim of the chuck. Under pressure, the upper rim of the liner is pinched against the tapered chuck brim, thus confining the rubber as effectively as if the chuck was circumferentially ledged on the inside just below the brim as at Fig. 4, and the rubber confined in this manner. A clearance of approximately .005 of an inch is provided between the external wall of the mold and the cavity wall of the liner to enable insertion and withdrawal of the mold without binding and to minimize the drag from chance frictional engagement, a coating of graphite may be applied to the internal wall of the liner, if desired.

When the mold is under pressure, as it would be in the press A or the squash batter B of Fig. 8, during the time the clay charge C is being spread over the molding surface by the die, the base 12 of the liner is displaced radially by the mold without permanent deformation up into the side wall zone and causes any gaps or voids between the circumferential wall of the mold and the opposing wall of the liner to be closed or filled. As a result, the mold is thus intimately gripped circumferentially and is uniformly reinforced over the entire external surface area located in the chuck. In case any soft or hard clay or other accumulation would collect unnoticed in the bottom of the liner, the mold will imbed the same in the rubber when the pressure is applied, thus permitting it to rest level.

The liner may be provided with fluid ducts containing a preferably, although not necessarily, substantially incompressible fluid such as water, glycerine or a semi-solid paste (or a resilient gas). It is preferred that the space provided for the fluid, for instance the communicating passages 16 and 17 located at spaced intervals in the side and base of the liner 18 shown in Fig. 10, be near the inner surface so that a comparatively thin section of material, easily extended, will lie between the fluid and the mold and a substantial thickness of wall as at 19 will separate the ducts from the chuck, this for the purpose of lending stability to the liner. When the mold is under pressure, some of the fluid in the ducts 16a in the base of the liner is displaced into the ducts 16 in the vertical walls, causing the walls to bulge outwardly and circumferentially grip the mold. The external dimensions of the liner correspond with those of Fig. 2.

The principle of construction of the chuck 20 shown in Fig. 3 is substantially the same as that of Fig. 2, except that it has been adapted dimensionally to accommodate flat ware molds. The base 21 of the liner is in the form of a thick perforated ring and the vertical walls, although short, taper upwardly and are rimmed at 22, the rim fitting in a circumferential notch at 23 in the chuck to resist extrusion incident to pressing. The chuck shell has a bossed suction opening 24 in its base through which vacuum is applied to the cavitous base 24a of the mold D to thereby assist in gripping the mold to the chuck. The rubber liner provides a reliable vacuum seal, however, the action of the liner under pressure in gripping and reinforcing the base of the mold is substantially the same as previously described in connection with the liner of Fig. 2.

The hollow ware chuck 25 shown in Fig. 4 is internally fluted or ribbed as at 26 around the internal circumference. Said ribs extend upwardly from the base of the chuck to a point below the rim of the chuck. They are of uniform height and dimensions and project radially into the chuck cavity and are arranged in spaced relation. The liner 27a, which is formed to fit between the ribs 26 and has a ring 27 fitted into the space between the tops of the ribs 27 and the upper rim of the chuck, is of one piece construction and has a comparatively thick, perforated base 28 adapted to fit around a suction bushing 29. Suction can be applied to the mold to grip the same to the chuck and in this connection, the bushing 29 has a plurality of suction openings 30 registering with a plurality of ducts 31 communicating with vertical slots 32 in the face of each rib. When the mold is seated, suction is applied through these slots, the rubber liner acting as a sealing means between suction zones. The circumferential backing up pressure is therefore localized in a series of opposed vertical zones and to a circumferential zone adjacent the brim of the chuck. This chuck combines the advantages of the chucks of Figs. 2 and 3 because it provides for both the application of suction to a hollow ware mold as well as external reinforcement.

In Fig. 5 the mold is mechanically gripped in a novel form of chuck which provides a plurality of hinged clamps 35 arranged in radially opposed pairs and pivoted at 36 to the slotted collar 37 of the chuck. The bottom the chuck 38, which is vertically movable, is slidably guided by stem 39 working in bore 40. When the bottom is depressed, arms 35 pivot and cause the clamps to move into gripping relation with the wall of the mold. The spring 41 elevates the bottom at the termination of the pressing operation causing the clamps to release. The bottom 38 and the mold engaging surfaces of the clamps 35 are rubber faced as at 34 and may be fluid filled (in accordance with the teachings of Fig. 10) if desired.

With reference to Fig. 1, the pressing machine shown is equipped with the chuck disclosed in Fig. 2. This chuck is detachably mounted on a sleeved head 42 and has radial pins 43 located in interrupted undercut grooves 44, see Fig. 6. The sleeve 45 is screwed on stem 46 for heightwise adjustment purposes and the stem has a shoulder 47 which rests on sleeve 48 carried by the crosshead 5. The stem 46 is centered and held in position in the sleeve 48 by a shank 49 and the entire assembly is centered with the vertical axis of the die.

Not only is the entire unit quickly substituted by these provisions, say for instance in changing from flat to hollow ware, but different chucks of the same class may be quickly mounted and adjusted for height. The unit has a suction duct 50 for connection with a vacuum line, should it be desirable to replace the chuck shown with that of Fig. 3 or 4.

In connection with the mounting for the dies, there is disclosed at 1 a rotatable turret mounted on a hollow shaft 52 which is journaled in cross members 53 supported between crosshead guides 54. The turret has a squared central portion, each face 55 of which has a large central opening to permit vertical displacement of the die base 56 (see die 2). The die base to which the die is attached by screws 57 is threaded into an adjusting ring 58 concentric with the opening, rotatably supported by L members 59. This arrangement simplifies vertical adjustment of the die which can be made while in operation.

The die illustrated at 2 is for making hollow ware and those at 3 and 4 for making flatware. Various die setups may be mounted on the turret depending on the type of ware being made, for instance, all hollow ware dies may be mounted in place of those shown where the production is on various sizes of cups and bowls. The dies are quickly alterable at the pressing position by withdrawing the indexing pin 60 from indexing disc 61 and rotating the turret by hand.

The dies are preferably heated either by steam or electricity to render same non-adhesive. Steam is piped through a header 62 concentric with the right hand end of shaft 52 and branches, such as the one shown at 63, to all of the dies, each of which is cavitous to provide the necessary steam or heating chamber. A common discharge line 65 is connected to outlet branches 64 leading from each die. In each branch 64 is a valve box 66 having a closure 67 which is operated by a lug 67a on the crosshead. When the crosshead rises the valve is opened to vent steam and condensate into the discharge line 65 and when the crosshead descends, the weight of the valve stem closes the valve. In case the dies are to be heated by electricity, then each die is provided with a heating element 70 and electrical connections 68. A pair of contacts 69 located adjacent the working position automatically engage the contacts 68 when the die is located into working position. If it is desired to preheat the die, it may be plugged in on a separate line a few minutes before it is put to use.

As the mold is brought up under the die, the top surface thereof engages a rubber pad or ring 71 which is contoured to correspond with the upper regions of the mold. This rubber ring tends to support the mold out of contact with metal and also serves to reinforce the same. The rubber ring is carried by a plate 71a which is mounted at the four corners on studs 72 and is held in a down position by springs 73. The purpose of this plate is to assist in pushing the mold away from the die upon withdrawal. The plate is normally elevated against spring tension incident to the press operation to a greater extent than that shown. The studs 72 are screwed into the face of the turret as shown.

After the piece has been pressed, the mold is lowered and deposited by its brim on a transfer mechanism 74 comprising a pair of spaced parallel bars with divided mold seats 73a. These seats are of heavy rubber construction for the purpose of cushioning the ledges and brims of the molds to thereby avoid chipping of the same.

The press may be operated with an automatic clay feeder which segregates charges of clay from conditioned slugs and accurately deposits same in the molds, in which case the transfer 74 would operate in the transportation of empty molds to the feeding position for filling and then to the press position. Furthermore, the press may be combined in a single unitary installation with an automatic profiling mechanism and feeder and in this event, the molds would be conveyed between all three positions by the transfer 74.

The present chuck improvements are also adaptable to use in the manufacture of bats or blanks by hand. Fig. 7 discloses a squash or impact batter B with the chuck of Fig. 3 mounted at the left hand end of the base 75 with the same locking or quick changing provisions as shown in Fig. 1. At the right hand end of the base is a centrally located support member for a laminated spring support 77 demountably and adjustably mounting a flatware die 78. The die is adapted to be brought into forcible engagement with the clay charge C on the mold by manually pulling down on the grip 78a. The clay, under the impact of the die, is spread to the brim zone of the mold thus forming a blank which may be completed subsequently by jiggering. Since the resultant shock to a normally unsupported mold may break it, the novel chuck herein disclosed is exceptionally suited to impact practice. The thickness of the blank is controlled by an adjustable bumper 76 having a resilient head 76a to provide for quick rebound and short dwell of the die on the clay. The die may be heated either by steam or electricity for the purpose of release. By substituting a plaster block for the chuck and replacing the die 78 with a batting out head, the machine may be operated in making bats for hand application to molds. The batting out head would be substantially the same as the die 78, except that the clay engaging surface would be flat instead of contoured. As in the case of the die, the head would be heated to insure release.

A rigid lever 79 pivoted at 80 and counterbalanced by spring 81 (or a weight not shown) may be substituted for the spring 77, as shown in Fig. 8. Also, a coil spring 82, Fig. 9, anchored at the rear end of the base may be substituted for the spring mounting 77. In case a counterbalance was employed with the lever 79, it would serve to add to the normal force of the impact and spring 81 would serve as a rebound or counterbalance means. The thickness of the bat or blank in either of the machines of Fig. 8 or Fig. 9 would be determined by the heightwise adjustment of the bumper. In the case of the machine of Fig. 1, the thickness of the blank or ware is controlled by adjusting ring 58 and rotation of sleeve 45 on which the chuck is mounted, a detent 83 being provided to lock the sleeve.

In the following claims, the term liner or lining shall be construed as meaning a supporting medium for molds having the characteristics of flowability, incompressibility and displaceability without permanent deformation.

In regard to the chucking provisions herein specified, it is to be noted that the liner provides, in addition to its other advantages, a temporary reinforcement for the mold in zones requiring support to prevent bursting from internal pressure incident to cooperation of the mold with the die. Furthermore, the brim of the mold as well as its base and side wall is temporarily reinforced incident to pressing by virtue of the rubber or equivalent ring 71.

In connection with Fig. 10, I have shown at 85 a fluid passage leading to the exterior of the liner which is connected to an outside fluid line 86 having a valve therein 87. The purpose of this is to illustrate that pressure may be applied to the fluid contained in the circumferential passages 16 from an outside source independently of the action of the mold in pressing into the base 12 of the liner. When pressure is applied, the liner is caused to grip the mold and thus the arrangement comprehends not only a reinforcing means but a gripping means and as such may be used for the support of the mold incident to profiling or other operations where it is possible to grip the mold to the support for the purpose of say for instance rotation as in jiggering.

It is pointed out that the chuck illustrated at 6 in Fig. 1 can be replaced by any one of the chucks shown in Figs. 2, 3, 4, 5 and 10 and therefore the invention comprehends not only the novel chucks per se but the combination thereof with a machine of the type herein illustrated.

With the foregoing and other objects in view, the invention resides in the novel arrangement and combination of parts and in the details of construction described, it being understood that changes in the precise embodiment of the invention herein disclosed may be made within the scope of what is claimed without departing from the spirit of the invention.

Having thus disclosed my invention, what I claim is:

1. Pressing apparatus for shaping articles of clay comprising a press member, a movable mold, a mold supporting member for centering, externally reinforcing and cushioning said mold against shock, means for moving one of said members relative to the other to effect a shaping operation, said mold supporting member including a socket into which said mold is freely insertable, the vertical wall portion of which is movable inwardly toward the axis of the mold into supporting engagement therewith after the mold has been received therein and having a mold seating surface capable of absorbing shocks.

2. Pressing apparatus for shaping articles of clay comprising a press member, a movable mold, a mold supporting member for centering, externally reinforcing and cushioning said mold against shock, means for moving one of said members relative to the other to effect a shaping operation, said mold supporting member including a socket into which said mold is freely insertable, the vertical wall portion of which is movable inwardly toward the axis of the mold into supporting engagement therewith after the mold has been received therein and having a mold seating surface capable of absorbing shocks and means for so moving the wall portion of the socket.

3. Pressing apparatus for shaping articles of clay comprising a press member, a movable mold, a mold supporting member for centering and externally reinforcing said mold, means for moving one of said members relative to the other to effect a shaping operation, said mold supporting member including a socket into which said mold is freely insertable, the vertical wall portion of which is movable inwardly toward the axis of the mold into supporting engagement with the exterior of the mold after the mold has been received in the socket and means for so moving the wall portion of the socket.

4. In a batting machine a movably mounted batting head, a mold and a support therefor said support comprising a body of shock absorbent material shaped to form a mold receiving socket the base of which cushions the mold and the wall of which centers and supports the mold against angular displacement.

5. Pressing apparatus for shaping clay and the like comprising a die member, a movable mold, a mold supporting member, means for moving one of said members relative to the other to effect a shaping operation said mold supporting member comprising a body formed of resilient material having a cavity therein for receiving said mold and a rigid member surrounding the body to confine and cause it to contract around and reinforce and hold said mold firmly in centered position when pressure is applied thereto during the batting out operation.

6. In a machine for applying clay to jiggering molds, a relatively movable die and mold support, a jigger mold to be supported thereby, said mold support comprising a rigid container having a mold receiving portion composed of resilient material shaped to permit said mold to be freely inserted therein and removed therefrom capable of being contracted around the outside of the mold.

7. In combination with a pottery mold, cooperable clay fabricating means, and a mold chuck for externally supporting the mold at a fabricating position including means movable into supporting engagement with the exterior of the mold in response to the pressure imposed by the fabricating means on the mold during fabrication.

8. In combination with an implement for fabricating dinnerware, a reciprocable chuck for receiving and supporting pottery molds in a forming position having a surface surrounding the mold composed of resilient material operable to grip the mold when under forming implement pressure.

9. In combination with an implement for fabricating dinnerware, a relatively movable mold chuck for receiving and supporting molds in a fabricating position comprising a cavitous rubber body in a rigid container which precludes outward radial expansion of the body under molding pressure and causes inward radial expansion into intimate contact with the mold.

10. In the manufacture of pottery ware, the method which comprises pressing a body of plastic clay to spread the same over the molding surface of a rigid plaster jiggering mold and protecting the mold against breakage by contracting the wall of a mold support therearound during spreading and releasing the mold from the grip of the support upon the completion of the spreading operation.

11. The method of externally reinforcing a plaster dinnerware mold whilst clay is shaped on on the molding surface thereof which comprises inserting the mold into a cavity formed in a body of resilient material and then, incident to the shaping operation, contracting the wall of the cavity around the outside of the mold to grip and support it by pressing the mold against the bottom of the cavity.

12. In a machine for shaping clay on jiggering molds, a relatively movable die and mold support said support being formed with a socket for receiving a mold and having a mold seating surface in the bottom thereof composed of shock absorbent material.

13. Batting out apparatus for shaping clay comprising a die member, a movable mold, a mold supporting member, means for moving one of said members relative to the other to effect a batting out operation, said mold supporting member comprising a holder formed to provide a socket in which said mold is received and supported at the batting out position and having a mold supporting surface composed of shock absorbent material.

14. Pressing apparatus for shaping clay and the like comprising a die member, a movable mold, a mold supporting member, means for moving one of said members relative to the other to effect a shaping operation, said mold supporting member being formed to provide a mold centering socket having a mold seating surface in the bottom thereof composed of shock absorbent material.

15. Pressing apparatus for shaping clay comprising a die member, a movable mold, a mold supporting member, means for moving one of said members relative to the other to effect a shaping operation, said mold supporting member comprising a rigid holder formed to provide a socket having a mold seating surface above the bottom of the socket and supported by the holder and composed of shock absorbent material.

16. Pressing apparatus for shaping clay and the like which comprises a die member, a movable mold, a mold supporting member, means for moving one of said members relative to the other to effect a shaping operation, said mold supporting member comprising a hollow metal container with a molded insert of shock absorbent material shaped to form a socket in which said mold is received.

17. Pressing apparatus for shaping clay on dinnerware molds comprising a die member, a movable mold having a brim flange, a mold supporting member, means for moving one of said members relative to the other to effect a shaping operation, said mold supporting member comprising a rigid support formed to provide a socket in which the lower portion of the mold is received and a body of shock absorbent material carried by the rigid support and arranged to be engaged by the underneath surface of the brim flange of the mold when said mold is inserted in the socket.

18. A chuck for receiving and supporting pottery molds at a batting out position comprising a rigid member for supporting a mold and having a receiving socket in which is disposed a mold cushioning seat composed of shock absorbent material.

19. Pressing apparatus for shaping articles of clay comprising a die member, a support therefor, a movable mold, a mold supporting member, means for raising and lowering said mold supporting member relative to said die to effect a shaping operation, said mold supporting member comprising a holder formed to provide a socket for receiving a mold and having a shock absorbent surface on which the mold rests.

20. Pressing apparatus for shaping clay and the like comprising a die member, a movable mold, a mold lifter, means for moving the lifter to raise said lifter and the mold up to the die to effect a shaping operation said lifter having a shock absorbent surface on which the mold rests and means for carrying said mold to said lifter to have the clay shaped thereon and for carrying said mold away after the clay is shaped.

21. Pressing apparatus for shaping clay and the like comprising a die member, a movable mold, a mold support member having a shock absorbent surface on which the mold rests, means for moving one of said members relative to the other to effect a shaping operation and a mold supporting means for carrying said mold to said mold support to have clay shaped thereon and for carrying said mold away after the clay is shaped theron.

22. In combination with an implement for shaping clay, a mold and means for supporting said mold in a fabricating position comprising a rigid container having formations projecting into the cavity portion thereof and a liner for the cavity formed of resilient material perforated so as to fit between the formations.

23. In combination with an implement for pressing and spreading out clay on the molding surface of a dinnerware forming mold, a pottery mold and means for supporting the same in a press position having a movable base on which said mold rests and a plurality of mold grippers to be actuated to grip the mold by molding pressure applied to the mold incident to a pressing operation and means for relatively moving said implement and said support.

24. In combination with a pottery mold, a press head for pressing out clay on the forming surface thereof and a mold receiver for supporting the mold at the press position, composed of resilient material shaped to form a socket for the mold and a support therefor, said support and said receiver having interfitting formations for holding the same in associated relation.

25. In combination with a pottery mold, a press member for pressing and spreading out clay on the forming surface of said mold, means for supporting the mold at the forming position comprising a body of resilient material shaped to form a socket for receiving a mold having a base portion of substantial thickness on which the mold rests and a hollow rigid shell surrounding the exterior of the ring having a ledge for confining the upper rim of the socket wall.

26. In combination with an implement for pressing and spreading out clay on the molding surface of a pottery mold, a pottery mold and means for supporting the same at the press position comprising a perforated ring of resilient material shaped to provide a socket for the base of the mold.

27. In combination with a pottery mold, an implement for fabricating clay on the molding surface of said mold, a support for said mold, said support and said implement being relatively movable, said support comprising a rigid, hollow shell having an insert within the cavity thereof composed of resilient material shaped to form a socket into which the mold base is freely insertable and being confined thereto in order to cause the wall of the socket to swell inwardly in response to the pressure involved in fabricating the clay and intimately embrace the mold base.

28. Pressing apparatus for shaping clay comprising a die member having a surface contoured for pressing out bats on jigger molds, means for rendering the pressing surface of the die member non adhesive to jigger clay, a movable jigger mold, a mold supporting member, means for moving one of said members relative to the other to effect a batting out operation, said mold supporting member comprising a holder formed to provide a socket into which said mold is freely insertable and from which said mold is freely removable and which supports the mold against radial displacement at the batting out position and which has a cushion seat on which the mold rests.

29. Pressing apparatus for shaping clay comprising a die member having a surface contoured for pressing out clay bats on jigger molds, means for rendering the press surface of the die member non adhesive to jigger clay, a movable jigger mold, a mold supporting member, means for moving one of said members relative to the other to effect a batting out operation, said mold supporting member comprising a holder having a socket therein and a body of shock absorbent material on which said mold rests located in the socket, the mold being freely insertable in and removable from the holder and supported against radial displacement at the pressing position thereby.

WILLIAM J. MILLER.